United States Patent [19]

Tsujimoto et al.

[11] Patent Number: 5,110,915

[45] Date of Patent: May 5, 1992

[54] PROCESS FOR PREPARATION OF LIGNOCELLULOSE PHENOLIC COMPOUND COMPOSITE PRODUCT

[75] Inventors: Naohiko Tsujimoto; Masaru Yamakoshi; Toshimitsu Kudo; Yukiko Horiuchi; Jiro Shimizu, all of Tokyo, Japan

[73] Assignee: Oji Paper Co., Ltd., Tokyo, Japan

[21] Appl. No.: 588,241

[22] Filed: Sep. 26, 1990

[30] Foreign Application Priority Data

Sep. 27, 1989 [JP] Japan .................................. 1-249174
Jul. 18, 1990 [JP] Japan .................................. 2-187976

[51] Int. Cl.$^5$ ...................... C08G 5/18; C08G 37/16; C08G 37/18
[52] U.S. Cl. ...................................... 530/502; 530/500
[58] Field of Search .............................. 530/502, 500

[56] References Cited

U.S. PATENT DOCUMENTS 3,441,527 4/1969 Broadhead et al. ................. 530/502

*Primary Examiner*—John Kight, III
*Assistant Examiner*—Duc Truong
*Attorney, Agent, or Firm*—Armstrong, Nikaido, Marmelstein, Kubovcik & Murray

[57] ABSTRACT

A lignosellulose-phenolic compound composite product having a weight ratio of the lignocellulose material to the phenolic compound of 0.4/1.0 to 5.0/1.0 is prepared by heat-dissolving the lignocellulose material in a solvent comprising, as a main component, at least one phenolic compound, optionally in the presence of a dissolving acid catalyst, and then adjusting the amount of the phenolic compound to a level of 1/0.4 to 1/5.0 of the weight of the lignocellulose material, in which heat-dissolving step water generated, as a by-product, from the reaction of the lignocellulose material with the phenolic compound is preferably eliminated, to allow the temperature of the reaction system to rise and thus promote the heat-dissolving reaction.

19 Claims, No Drawings

PROCESS FOR PREPARATION OF LIGNOCELLULOSE PHENOLIC COMPOUND COMPOSITE PRODUCT

BACKGROUND OF THE INVENTION (1) Field of the Invention

The present invention relates to a lignocellulose-phenolic compound composite product and a process for the preparation of same. More particularly, the present invention relates to a lignocellulose-phenolic compound composite product in which the lignocellulose is in the form of a uniform solid solution having a high concentration thereof in the phenol compound, and which is useful as a starting material for resinous materials and other industrial materials.

(2) Description of the Related Arts

Resources produced from forests are regeneratable, and an effective recycle utilization of these resources is currently urgently required. For example, in industries using wood as the starting material, such as pulp and wood industries, the establishment of a process for an effective utilization of woody wastes generated from these industries is required. Moreover, an early development of a process for an effective utilization of agricultural wastes containing a lignocellulose substance, such as rice straw and rice hulls, is required.

Regarding an effective utilization of lignocellulose materials including wood, for example, Japanese Unexamined Patent Publication No. 57-2360 and Japanese Examined Patent Publication No. 63-1992 disclose a process in which a chemically modified lignocellulose material obtained by introducing at least one substituent into some of the hydroxyl groups in the lignocellulose molecule is dissolved in an organic solvent, and the formed solution is utilized as a starting material for various resinous materials.

Furthermore, Japanese Unexamined Patent Publication No. 60-206883 and Japanese Unexamined Patent Publication No. 60-104513 disclose a process in which a solution of lignocellulose material is utilized as a phenol compound-formaldehyde resin adhesive, and a process in which the solution is formed into a fiber.

Moreover, Japanese Unexamined Patent Publication No. 61-215676 and Japanese Unexamined Patent Publication No. 61-215675 disclose a process in which a molded body, a foamed body or an adhesive is prepared by dissolving a lignocellulose material in a solvent comprising a polyhydric alcohol or a bisphenol compound and using this solution in combination with a polyurethane, epoxy or other resin material.

Still further, Japanese Unexamined Patent Publication No. 61-261358 discloses a process in which a wood material, which is not chemically modified, is directly dissolved in a solvent comprising a phenol compound or a bisphenol compound without using a catalyst, and Japanese Unexamined Patent Publication No. 62-79230 discloses a process in which a wood material, which is not chemically modified, is directly dissolved in a solvent comprising an alcohol compound, a polyhydric alcohol compound, an oxyether compound, a cyclic ether compound or a ketone compound, without using a catalyst.

Japanese Examined Patent Publication No. 61-2697 discloses a technique of dissolving a wood flour in phenol in the presence of a mineral acid, and Japanese Unexamined Patent Publication No. 1-217070 discloses a similar technique.

Recently, the necessity for an effective utilization of waste-paper has increased, but a technique of utilizing an additional value of waste-paper as a lignocellulose material, especially converting waste-paper to a resin material, has not been developed.

The above-mentioned conventional techniques for the utilization of lignocellulose materials are defective in that the lignocellulose concentration in the product is low, for example, 30% by weight or less, generally 20% by weight or less, and therefore, the practical application field or application method is limited. Moreover, a process for preparing a product containing lignocellulose at a high concentration is not known.

In general, even if it is intended to dissolve lignocellulose in a phenol compound at a high concentration, for example, at a concentration of 50% by weight or more, a uniform solid solution composite product cannot be obtained, and accordingly, a phenol compound mixture containing lignocellulose at such a high concentration cannot be used as an industrial starting material because the quality is uneven.

In the conventional technique of dissolving a lignocellulose material in a phenol compound, the mechanism for promoting the dissolving reaction has not yet been made clear, and the development of a technique of promoting this dissolving reaction is indispensable and very important in the realizing of an industrial utilization of a lignocellulose material-phenol compound composite product.

Furthermore, the utilization of waste-papers is now important, and the development of the use of waste-papers in various fields is greatly desired. Especially, a realization of a technique of converting waste-paper to a resinous material is urgently demanded.

SUMMARY OF THE INVENTION

An object of the present invention is to provide a lignocellulose-phenolic compound composite product comprising a lignocellulose material in a high concentration, for example, 30% by weight or more, and in the form of a uniform solid solution in at least one phenolic compound, which composite product is useful as an industrial resinous material, and a process for the preparation of the same.

Another object of the present invention is to provide a lignocellulose-phenolic compound composite product having a high concentration of a lignocellulose material therein, and thus useful as an industrial resinous material, and a process for the preparation of the same with a uniform quality at a high efficiency.

The above-mentioned objects are attained by the lignocellulose-phenolic compound composite product comprising a lignocellulose material reacted with and homogeneously dissolved in at least one phenolic compound at a weight ratio of the lignocellulose material to the phenolic compound of from 0.4/1.0 to 5.0/1.

The above-mentioned lignocellulose-phenolic compound composite product can be prepared by the process of the present invention, comprising the steps of; subjecting a mixture of a lignocellulose material with a solvent comprising, as a main component, at least one phenolic compound to a heat-dissolving procedure in which the lignocellulose material is reacted with the phenolic compound and dissolved in the solvent to form a homogeneous solution; and removing a portion of the solvent from the solution to adjust the weight ratio of the lignocellulose material to the phenolic compound to a level of from 0.4/1 to 5.0/1.

Optionally, in the heat-dissolving procedure of the process of the present invention, water generated, as a by-product, from the reaction of the lignocellulose material with the phenolic compound is eliminated from the reaction system to allow the temperature of the reaction system to rise, and thus the heat-dissolving reaction is promoted.

DESCRIPTION OF THE PREFERRED EMBODIMENTS

The lignocellulose-phenolic compound composite product of the present invention comprises a lignocellulose material reacted with and homogeneously dissolved in at least one phenolic compound.

The lignocellulose material usable for the present invention is preferably selected from plant fiber materials including wood pieces, wood meals, wood fibers, wood chips, veneer scraps, plywood scraps, wastepaper, pulps, rice straw, rice hulls, kaoliang straw, bagasse, bamboo, and wheat straw.

The lignocellulose material usable for the present invention includes at least one member selected from the group consisting of cellulose, hemicellulose, and lignin.

In the present invention, the phenol compound for forming a solution composite product with the lignocellulose material can be selected from compounds described below.

(1) Monohydric phenolic compounds, for example, phenol, o-, m- and p-cresols, 3,5-, 2,3- and 2,6-xylenols, o-, m-, and p-propylphenols, o-, m- and p-butylphenols, o-, m- and p-sec-butylphenol, o-, m- and p-tert-butylphenols, hexylphenol, phenylphenol, octylphenol and naphthol.

(2) Trihydric phenolic compounds, for example, catechol, resorcinol, quinol, bisphenol A, bisphenol B and bisphenol F.

(3) Trihydric phenolic compounds, for example, pyrogallol, chlorogycine, trihydrobenzene and gallic acid.

In the lignocellulose-phenol compound composite product of the present invention, the weight ratio of the lignocellulose material to the phenolic compound is high, from 0.4/1.0 to 5.0/1.0, and the lignocellulose material and phenol compound are mutually dissolved homogeneously to form a homogeneous solid composite product. For example, when 20 parts of waste newspaper and 80 parts of phenol are mutually dissolved under refluxing conditions at 130° C. in the presence of 1.4 parts of a titanium chloride catalyst, the amount of the reacted phenol is increased with the lapse of the heat-dissolving time as described below. Namely, when the heat-dissolving times are 1.5, 2.0, 3.0, and 32.0 hours, the amounts of phenol reacted with 20 parts of waste-paper are 9.0, 11.0, 14.0, and 22.0 parts, respectively, and the amounts of unreacted phenol are 71, 69, 66 and 58 parts, respectively. When the unreacted phenol is completely removed, the weight ratios of wastepaper to phenol in the resultant composite product are 2.2/1, 1.8/1, 1.4/1, and 0.9/1, respectively. Accordingly, in the preparation of the lignocellulose-phenolic compound composite product of the present invention, the heat-dissolving time is preferably adjusted according to the desired weight ratio of the two components.

In general, when an acid substance is present as a dissolving catalyst for dissolving a lignocellulose material in a phenolic compound, a chemical bonding between lignocellulose and the phenolic compound is promoted. Therefore, the composite product of the present invention containing a lignocellulose material at a high weight ratio such as from 0.4/1 to 5.0/1, in which lignocellulose and a phenolic compound are mutually uniformly dissolved, is a novel substance regarded as unobtainable according to the conventional techniques, and this composite product can be widely used as a starting material for various resinous products.

In the composite product of the present invention, when the weight ratio of lignocellulose to the phenolic compound is less than 0.4/1, the molding processability is not satisfactory. If this weight ratio is more than 5.0/1, the mechanical strength of a molded article prepared from the resultant composite product is too low.

The lignocellulose-phenolic compound composite product of the present invention is a solid substance, as pointed out hereinbefore, and preferably this composite product is pulverized and put to practical use in the form of particles or a powder.

According to the process of the present invention, the lignocellulose material is incorporated into a solvent comprising, as the main component, at least one phenolic compound and the resultant mixture is heated while effecting the dissolution uniformly, whereby a lignocellulose-phenolic compound composite product in the state of a solution is formed. The solvent usable for the process of the present invention comprises the phenol compound at a content of at least 50% by weight. The solvent preferably consists essentially of at least one phenolic compound. If necessary, the solvent can contain another compound which is compatible with the phenolic compound and can be easily removed together with the phenolic compound. For example, the compound is selected from aromatic hydrocarbon solvents, e.g., xylene and toluene.

In the preparation of the above-mentioned solution, to uniformly dissolve the lignocellulose material, preferably the weight ratio of the lignocellulose material to the phenolic compound is from 0.1/1 to 0.35/1, more preferably from 0.2/1 to 0.25/1. If this weight ratio is lower than 0.1/1, a large quantity of energy and a long time are required for removing the phenolic compound at the subsequent step. If the weight ratio of the lignocellulose material is higher than 0.35/1, it is difficult to obtain a homogeneous solution.

In the process of the present invention, the lignocellulose material is mixed with the phenolic compound solvent, and a dissolving catalyst is added if necessary. The mixture is heated at a predetermined temperature and the lignocellulose material is dissolved while refluxing the solvent. The dissolving temperature is not particularly critical, and can be set in accordance with the kind and concentration of the liglocellulose material, the kind of phenolic compound, and the pressure of the reaction system. In general, in the case of a dissolution under the ambient atmospheric pressure, the dissolving temperature is preferably 100° to 200° C., and in the case of a dissolution under a pressure higher than the ambient atmospheric pressure, the dissolving temperature is preferably 200° to 300° C.

The heat-dissolving procedure is carried out with stirring for 1 to 10 hours, preferably 2 to 5 hours.

The dissolving catalyst usable for the process of the present invention preferably comprises at least one member selected from the compounds described below.

(1) Inorganic (mineral) acids, for example, hydrochloric acid, sulfuric acid, phosphoric acid and hydrogen bromide.

(2) Organic acids, for example, (a) carboxylic acids, for example, formic acid, acetic acid, oxalic acid, tartaric acid and benzoic acid, (b) organic sulfonic acids, for example, phenolsulfonic acid and p-toluenesulfonic acid, (c) organic sulfinic acids, for example, phenolsulfinic acid and (d) other organic acids, for example, uric acid.

(3) Lewis acids, for example titanium tetrachloride and aluminum chloride.

Preferably, the dissolving catalyst is used in an amount of 0.1 to 20%, based on the weight of the lignocellulose material.

In the process of the present invention, a portion of the solvent is removed from the lignocellulose/phenol compound solution, to adjust the concentration of the lignocellulose material to a level of from 30% to 85% by weight.

The method of removing a portion of the solvent comprising the phenol compound as the main component is not particularly critical, but preferably, the portion of the solvent is collected and recovered at the outside of the reaction system by distillation or evaporation under the ambient atmospheric pressure or a reduced pressure. If the concentration of lignocellulose in the lignocellulose-phenol compound solution is increased to a level of about 40% (the weight ratio of lignocellulose to the phenol compound exceeds 2/3) or more, by a removal of the portion of the solvent, the solution loses its flowability and finally becomes a solid, and thus an industrial handling of the resultant composite product becomes difficult.

Accordingly, when the removal of the portion of the solvent is completed, the resultant solid composite product is pulverized and put to practical use in the form of particles or a powder. The pulverization method is not particularly critical, and a usual crusher or the like can be employed.

The pulverized composite product can be used as a starting material for a phenolic resinous material or a novolak resin. Namely, if the composite product is methylolated by formaldehyde, the methylolated composite product can be utilized as a resol type resinous material. When the composite product is mixed with a wood flour or glass fiber, and the resultant resinous composition is molded by using hexamine as a curing agent, the resultant molded product is equivalent to that obtained from a usual phenolic resin material.

Accordingly, the composite product of the present invention can be used in all fields in which phenolic resins are usually used.

In the process of the present invention, the heat-dissolving reaction of the lignocellulose material with the phenolic compound can be promoted in such a manner that, in the heat-dissolving step, water generated as a by-product from the reaction of the lignocellulose material with the phenol compound is eliminated from the reaction system, to allow a rise of the temperature of the reaction system.

In the process of the present invention, the heat-dissolving reaction of the lignocellulose material with the phenolic compound can be further promoted by adding a dissolving catalyst to the reaction system.

The dissolving catalyst preferably comprises at least one member selected from the group consisting of the mineral acids, organic acids, and Lewis acids as mentioned above. The dissolving catalyst is preferably added at two or more stages before and after the water-eliminating operation.

The inventors of the present invention carried out research into the technique of dissolving a lignocellulose material, for example, waste-paper, in a phenol compound with the aid of an acid catalyst, and as a result, found that the phenol compound is chemically to form a composite product, and this composite product-forming reaction is mainly a dehydration reaction.

Accordingly, the inventors tried to promote this dehydration reaction by eliminating water generated by the reaction from the reaction system by evaporation or distillation, and confirmed that, by this operation, the temperature in the reaction system can be elevated by the elimination of water having a boiling point lower than that of the phenolic compound, and that this operation effectively promotes the dehydration reaction.

Still further, it was found that, when an acid catalyst is added after the elimination of water from the reaction system, the reaction time can be shortened to ¼ [of that for the usual method, and the industrialization of the process of the present invention becomes more promising.

In one embodiment of the present invention, a reaction vessel was charged with a solvent comprising at least one phenolic compound, and a lignocellulose material, for example, waste paper, in an amount of 35 parts by weight or less per 100 parts by weight of the phenol compound, and the temperature of the reaction system is elevated to a predetermined level and when the entire mixture shows a flowability, a stirring operation is initiated and the reaction is stopped after the lapse of a certain dissolving reaction time.

The charging order of the starting materials is not particularly critical, and the above-mentioned order can be adopted. Alternatively, there can be adopted a method in which the lignocellulose material is charged in the reaction apparatus and then the phenol compound is added, if necessary, together with the dissolving catalyst. Furthermore, the catalyst may be added simultaneously with the lignocellulose material.

At the above-mentioned heat-dissolving step, water generated by the dehydration reaction is eliminated from the reaction system. For the removal of water, there can be adopted a method using a usual evaporation or distillation apparatus. Namely, water generated by the reaction is condensed by a cooler and taken out of the reaction system.

The amount of the water to be eliminated is set to a value at which the temperature of the reaction system reaches a desired level. In general, if the water generated by the dehydration reaction is eliminated in an amount corresponding to 10% of the weight of the charged lignocellulose material, the temperature in the reaction system is elevated by several tens of degrees. For example, when the temperature of the heating medium to the reaction vessel is 185° C., the temperature in the reaction system at the start of the reaction is about 125° C., but if water generated by the reabtinn is eliminated in an amount corresponding to 10% of the weight of the charged lignocellulose material, the temperature of the reaction system is elevated to 160° C.

When the temperature in the reaction system becomes higher by several tens of degrees than the temperature before the elimination of water, the water-eliminating operation is stopped.

As apparent from the foregoing description, at the step of the heat-dissolving reaction between the lignocellulose material and the phenol compound, preferably the water-eliminating operation is started at a temperature of 80° to 130° C. under the ambient atmospheric pressure or at a temperature of 120° to 180° C. under a pressure of 2 to 10 kg/cm2G.

Immediately after the start of the heat-dissolving reaction, the reaction mixture is not in a condition in which the reaction mixture can be uniformly stirred, and thus the water-eliminating operation cannot be performed. In general, when 15 to 30 minutes have passed from the start of the heat-dissolving reaction, an initiation of the water-eliminating operation becomes possible, and after the eliminating operation has been conducted for about 30 minutes, the amount of eliminated water reaches the desired level.

In the process of the present invention, the dissolving catalyst may be added to the reaction system before the start of the heat-dissolving reaction, or the catalyst may be added dividedly at two or more stages before and after the water-eliminating reaction. Namely, in the case of a one-stage addition of the catalyst, all of the catalyst is added to the reaction system at the start of the heat-dissolving reaction, and catalyst, the addition in the former stage is performed at the start of the heat-dissolving reaction, and the addition in the latter stage is carried out after the temperature of the reaction system has been elevated by the water-eliminating operation.

According to the multiple stage addition method, the charging operation in the former state is carried out at the start of the heat-dissolving reaction, and in the charging operation at the latter stage, the catalyst is directly added to the inside of the reaction apparatus, or a solution preformed by dissolving the catalyst in a small amount of a fresh phenol compound is added to the inside of the reaction apparatus.

Where the amount of the added catalyst in the addition operation at the former stage is too small, sometimes the heat-dissolving reaction is not sufficiently advanced and the reaction mixture is not uniformly stirred. Accordingly, in the addition operation at the former stage, the catalyst should be charged in an amount which will guarantee a uniform stirring. For example, where titanium tetrachloride is used as the dissolving catalyst, the catalyst must be added in an amount of at least about 1% by weight based on the total amount of all the charged starting materials at the former stage.

In the case of the multiple stage addition, as long as the addition of the above-mentioned minimum amount is guaranteed, the other conditions are not particularly critical.

In accordance with the present invention, a lignocellulose-phenolic compound composite product having a high weight ratio of the lignocellulose material to the phenolic compound of from 0.4:1 to 5.0:1 was obtained for the first time.

Also, the composite product-forming reaction of the lignocellulose material with the phenolic compound can be promoted by eliminating a portion of the by-product of the composite product-forming reaction consisting of water during the composite product-forming procedure.

Also, the composite product-forming reaction can be promoted by an addition of a specific dissolving catalyst to the reaction mixture, preferably at two or more stages before and after the water-eliminating operation.

EXAMPLES

The present invention will now be described in detail with reference to the following specific examples.

EXAMPLE 1

A reaction vessel equipped with a refluxing device was charged with 20 parts by air-dried weight of undeinked waste newspaper-sheets, 80 parts of phenol by weight and 1.4 parts by weight of titanium tetrachloride, and the mixture was dissolved on an oil bath at a temperature of 120° C. for 3 hours. Then, 67 parts by weight of unreacted phenol was removed from the resultant solution by evaporation under a reduced pressure. When cooled to room temperature, the resultant waste paper-phenol-composite product had no flowability and could be easily pulverized in a mortar.

In the resultant waste paper-phenol composite product, the weight ratio of the waste paper to phenol was $20/(80-67) = 20/13 = 1.54/1$.

APPLICATION EXAMPLE 1

The powdery composite product of Example 1 in an amount of 40 parts by weight was dissolved in a 14% aqueous caustic soda solution in an amount of 40 parts by weight, and 70 parts by weight of an formaldehyde aqueous solution were added to the solution and reaction was carried out at a temperature of 80° C. for 30 minutes to provide a resolated composite product. The resolated composite product was applied together with a coconut shell powder to a simple plywood veneer sheet, and a three-layer plywood was prepared from three pieces of the resolated composite product-applied veneer sheets and the bonding strength of the resultant three-layer plywood sheet was measured. It was found that the bonding strength was 15 kgf/cm$^2$, which is higher than the normal state bonding strength of 12 kgf/cm$^2$ specified in JIS K-6802

APPLICATION EXAMPLE 2

A mixture of 50 parts by weight of the powdery composite product of Example 1, with 50 parts by weight of a wood flour, and 12 parts by weight of hexamine was hot-pressed and formed into dumbell-shaped specimens at a temperature of 150° C. in accordance with JIS K-6902, and the tensile strength of the resultant dumbbell-shaped specimens were measured. It was found that the tensile strength was 600 kgf/cm$^2$, which is comparable to that of a phenolic resin article of the standard grade.

EXAMPLE 2

The same procedures as in Example 1 were carried out, with the following exceptions.

Undeinked waste newspaper sheets in an amount of 20 parts of air-dried weight was reacted with and dissolved in a mixture of 80 parts by weight of phenol with 1.3 parts by weight of titanium tetrachloride, at a temperature of 150° C. for 32 hours. Then, 52.5 parts by weight of unreacted phenol was removed from the resultant solution by distillation under a reduced pressure.

In the resultant waste paper-phenol composite product, the weight ratio of the waste paper the phenol was $42:58 = 0.72:10$.

The waste paper-phenol composite product had a softening point of 100° C. determined by a melting point-measurement method, and contained 4.1% of unreacted phenol.

APPLICATION EXAMPLE 3

A mixture of 50 parts by weight of the composite product of Example 2 with 50 parts by weight of a wood flour and 15 parts by weight of hexamine was kneaded by kneading rolls and formed into a shaped article. The flexural strength of the shaped article was measured under the ambient atmospheric conditions in accordance with JIS K6911 and it was found that the flexural strength of the article was 7.2 kf/cm$^2$, which was higher than that indicated in JIS K6915.

EXAMPLE 2

Distillation of Formed Water and Divided Addition of Catalyst

A reaction vessel equipped with a refluxing device was charged with a mixture of 20 kg (air-dried weight) of undeinked waste newspaper sheets, with 80 kg of phenol and 1.3 kg of titanium tetrachloride, and the mixture was subjected to a heat-dissolving procedure for 1 hour on an oil bath maintained at 185° C. so that the inner temperature of the reaction vessel was maintained at 125° C. Then, a cooling tube was attached to the reaction vessel, and 2.5 kg of water, which was generated as a by-product of the heat-dissolving reaction, was eliminated by distillation, whereby the inner temperature of the reaction vessel was elevated from 125° C. to 160° C. Then, 1.3 kg of titanium and the heat-dissolving reaction was continued for 2 hours. That is, the total reaction time was 3 hours. The amount of the undissolved waste paper in the resultant reaction mixture liquid was 13.4% based on the total weight of the waste paper.

Then a portion of phenol in the reaction mixture was removed.

The amount of the residual unreacted phenol in the resultant composite product was 4% based on the weight of the composite product.

The amount of phenol reacted with the waste paper was 100 parts by weight per 100 parts by absolute dry weight of the waste paper. The weight ratio of the waste paper to phenol in the resultant composite product was 0.9:1.0.

COMPARATIVE EXAMPLE 1

No Elimination of Water, and One-stage Addition of Catalyst

The same procedures as in Example 3 were carried out with the following exceptions.

The heat-dissolving reaction was carried out for 3 hours in the presence of a dissolving catalyst consisting of the 2.6 kg of titanium tetrachloride added in the one-stage addition manner and the water generated from the reaction was not eliminated by distillation. The amount of the undissolved waste paper was 21.9% based on the total weight of the waste paper. This amount of the undissolved waste paper was about 40% larger than that of the undissolved waste paper obtained in Example 2. The weight ratio of the waste paper to phenol in the resultant composite product was 1.1:1.0.

COMPARATIVE EXAMPLE 2

No Elimination of Water, and Multiple Stage Addition of Catalyst

The same procedures as in Example 3 were carried out except that in the heat-dissolving reaction, 1.3 kg of titanium tetrachloride were added to the reaction mixture and the reaction was carried out for 1 hour, and then, 1.3 kg of titanium tetrachloride was further added to the reaction mixture without eliminating the by-product water, and the reaction was further conducted for 2 hours. The amount of the undissolved waste paper in the reaction mixture was 18.8% based on the total weight of the waste paper. This amount of the undissolved waste-paper was about 30% by weight over the Example 3. The weight ratio of the waste paper to phenol in the resultant composite product was 1.0:1.0.

EXAMPLE 4

Prolongation of Reaction Time of Example 3

The same procedures as in Example 3 were carried out with the following exceptions.

The total heat-dissolving reaction time was prolonged to 6 hours. When the amount of the undissolved waste paper in the resultant reaction mixture was measured, it was found that the amount was 8.1% based on the total weight of the waste paper, which was much lower than the amount obtained in Example 3. The weight ratio of the waste paper to phenol in the resultant composite product was 0.8:1.0.

COMPARATIVE EXAMPLE 3

Prolongation of Reaction Time of Comparative Example 2

The same procedures as in Comparative Example 2 were carried out with the following exceptions.

The heat-dissolving reaction time was prolonged to 6 hours in total. That is, the reaction was conducted for the same time period as adopted in Example 4. The amount of the undissolved waste paper in the resultant reaction mixture was 15.5% and was still insufficient. The weight ratio of the waste paper to phenol in the resultant composite product was 1.0:1.0.

COMPARATIVE EXAMPLE 4

The same procedures as in Comparative Example 2 were carried out with the following excepthon.

The heat-dissolving reaction time necessary to obtain the same amount of the undissolved waste paper as attained in Example 4 was measured, and it was found that the necessary time period was 24 hours. Thus, it was confirmed that the comparative process could not be practically adopted.

EXAMPLE 5

Change of Starting Material in Example 3

The same procedures as in Example 3 were carried out with the following exceptions.

A cellulose powder (trademark: Avicel, supplied by Asahi Kasei) was used instead of the starting waste paper. The amount of the undissolved cellulose in the resultant reaction mixture was 15.2% based on the total weight of cellulose. The weight ratio of the cellulose powder to phenol in the resultant composite product was 0.7:1.0.

COMPARATIVE EXAMPLE 5

Change of Starting Material in Comparative Example 1

The same procedures as in Example 3 were carried out with the following exceptions.

A cellulose powder (Avicel) was used instead of the starting waste paper. The amount of the undissolved cellulose in the resultant reaction mixture was 26.9% based on the total weight of the cellulose. The weight ratio of the cellulose powder to phenol in the resultant composite product was 0.8:1.0.

EXAMPLE 6

Elimination of Water and No. Addition of Catalyst at Latter Stage

The same procedures as in Example 3 were carried out except that the addition of the catalyst at the latter stage after the water-elimination was not conducted. The amount of the undissolved waste-paper in the resultant reaction mixture was 25.3% based on the total weight of the waste paper. The weight ratio of the waste paper to phenol in the resultant composite product was 1.1:1.0.

COMPARATIVE EXAMPLE 6

No Elimination of Water, and No Addition of Catalyst at Latter Stage

The same procedures as in Example 3 were carried out except that the elimination of water was not carried out and addition of the catalyst at the latter stage was not conducted. The amount of the undissolved waste-paper in the resultant reaction mixture was 30.4% based on the total weight of the waste paper. The weight ratio of the waste paper to phenol in the resultant composite product was 1.3:1.0.

We claim:

1. A lignocellulose-phenolic compound composite product comprising a lignocellulose material reacted with and homogeneously dissolved in at least one phenolic compound at a weight ratio of the lignocellulose material to the phenolic compound of from 0.4/1.0 to 5.0/1.0.

2. The lignocellulose-phenolic compound composite product as claimed in claim 1, wherein the lignocellulose material comprises at least one member selected from the group consisting of wood pieces, wood meals, wood fibers, wood chips, veneer scraps, plywood scraps, waste paper sheets, pulp rice straw, rice hulls, kaoliang straw, bagasse, bamboo pieces, and wheat straw.

3. The lignocellulose-phenolic compound composite product as claimed in claim 1, wherein the phenolic compound is selected from phenol, o, m and p-cresols, 3,5-, 2,3- and 2,6-xylenols, o, m, and p-propylphenols, o, m, and p-butyl phenols, o, m, and p-sec-butylphenols, o, m, and p-tert-butylphenols, hexylphenol, pentylphenol, octylphenol, naphthol, catechol, resorcinol, quinol, bisphenol A, bisphenol B, bisphenol F, pyrogallol, chloroglycine, trihydrobenzene 4. A process for the preparation of a lignocellulose-phenolic compound composite product, comprising the steps of:
subjecting a mixture of a lignocellulose material with a solvent comprising, as a main component at least one phenolic compound to a heat-dissolving procedure in which the lignocellulose material is reacted with the phenol compound and dissolved in the solvent to form a homogeneous solution, and
removing a portion of the solvent from the solution to adjust the weight ratio of the lignocellulose material to the phenolic compound to a level of from 0.4/1.0 to 5.0/1.0.

5. The process as claimed in claim 4, wherein in the heat-dissolving procedure, the solvent contains at least 50% by weight of at least one phenolic compound.

6. The process as claimed in claim 4, wherein the solvent consists of at least one phenolic compound.

7. The process as claimed in claim 4, wherein in the heat-dissolving procedure, the lignocellulose material is in a weight ratio to the phenolic compound of from 0.1/1 to 0.35/1.

8. The process as claimed in claim 4, wherein the heat dissolving procedure is carried out while refluxing the solvent.

9. The process as claimed in claim 4, wherein the heat-dissolving procedure is carried ut in the presence of a dissolving catalyst comprising at least one member selected from the group consisting of mineral acids, organic acids and Lewis acids, at a temperature of from 100° C. to 200° C. under ambient atmospheric pressure.

10. The process as claimed in claim 4, wherein the heat-dissolving procedures is carried out in the absence of a dissolving catalyst at a temperature of 200° C. to 300° C. under a pressure higher than the ambient atmospheric pressure.

11. The process as claimed in claim 9, wherein the dissolving catalyst is present in an amount of 0.1% to 20% based on the weight of the lignocellulose material.

12. The process as claimed in claim 4, wherein in the solvent-removing procedure, the content of the lignocellulose material in the composite product is adjusted to 30% to 85% by weight.

13. The process as claimed in claim 4, wherein the solvent-removing procedure is carried out by evaporating away a portion of the solvent.

14. The process as claimed in claim 4 wherein, in the heat-dissolving step, water generated, as a by-product, from the reaction of the lignocellulose material with the phenolic compound is eliminated from the reaction system to allow the temperature of the reaction system to rise, whereby the heat-dissolving reaction is promoted.

15. The process as claimed in claim 14 wherein, in the heat-dissolving step, a dissolving catalyst comprising at least one member selected from the group consisting of mineral acids, organic acids and Lewis acids is added to the reaction system at two or more stages before and after the water-eliminating operation.

16. The process as claimed in claim 14 wherein, in the heat-dissolving step, the water-eliminating operation is carried out by evaporating away water at a temperature of from 80° C. to 180° C. under a pressure of from the ambient atmospheric pressure to 10 kg/cm$^2$G.

17. The process as claimed in claim 16, wherein the water-evaporating operation is carried out at a temperature of 80° C. to 130° C. under the ambient atmospheric pressure.

18. The process as claimed in claim 16, wherein the water-evaporating operation is carried out at a temperature of 120° C. to 180° C. under a pressure of 2 to 10 kg/cm$^2$G.

19. The process as claimed in claim 14, wherein the water-eliminating operation is initiated 15 to 30 minutes after the start of the heat-dissolving procedure.

* * * * *